June 8, 1965 P. A. ORNER 3,187,732
FUEL METERING APPARATUS
Filed Aug. 14, 1963 5 Sheets-Sheet 1

INVENTOR.
PETER A. ORNER
BY
Woodling Ksot Granger + Rust
Attys.

June 8, 1965 P. A. ORNER 3,187,732
FUEL METERING APPARATUS
Filed Aug. 14, 1963 5 Sheets-Sheet 3

INVENTOR.
PETER A. ORNER
BY
Woodling, Krost, Granger + Krost
Attys

June 8, 1965 P. A. ORNER 3,187,732
FUEL METERING APPARATUS
Filed Aug. 14, 1963 5 Sheets-Sheet 5

INVENTOR.
PETER A. ORNER
BY
Woodling, Krost, Granger + Rust
attys.

United States Patent Office 3,187,732
Patented June 8, 1965

3,187,732
FUEL METERING APPARATUS
Peter A. Orner, 23971 Fairmount Blvd.,
Beechwood, Ohio
Filed Aug. 14, 1963, Ser. No. 302,196
6 Claims. (Cl. 123—119)

The invention disclosed herein pertains to the application of the speed-density fuel metering scheme to a high performance internal combustion engine. The basic system is applied to both supercharged and normally aspirated engines with new and improved means for sensing the engine inlet manifold pressure and forming the fuel-air mixture.

Any internal combustion engine requires the delivery of a predetermined ratio of fuel and air for optimum performance. For the high performance spark ignited racing engine, the performance criterion is simply that of obtaining maximum power over the engine's full operating range. On this basis, the optimum air-fuel ratio by weight is determined by the nature of the fuel, being approximately 12:1 for gasoline, and 6:1 for methanol. With provision for richening the mixture during idle operation, the delivery of the constant ratio of air to fuel is the essential task of a racing injection system.

The spark ignited four cycle engine is especially sensitive to mixture variations in the vicinity of the spark plug, since optimum performance can be achieved only if the initial combustion characteristics are satisfactory. Various attempts have been made to utilize direct fuel injection into the combustion chamber to assure a "correct" mixture in the vicinity of the spark plug, among other things, but the resultant systems have always been quite expensive and complex.

The formation of the mixture prior to induction into the combustion chambers has the advantage of lower cost and increased reliability, especially if a continuous flow system is used. The combining of air and fuel, however, must be done in such a manner as to provide a homogeneous mixture to the engine inlet valves, or erratic low speed operation and possible high speed lean-out may occur.

An object of this invention is to provide a simple, inexpensive and rugged manifold-pressure sensitive fuel regulation valve which is responsive to manifold pressures both greater than and less than atmospheric. This valve is designed so as to accomplish both the functions of metering and injection into the manifold if so desired.

Another object is to provide a means for obtaining the fuel-air homogeneity necessary for good throttle response and clean part throttle operation, especially in a supercharged racing engine.

Another object is to provide for an easily varied relationship between the fuel flow and both engine speed and engine inlet manifold pressure, if other than linear characteristics are desired.

Other objects and advantages will be readily apparent from the following description and illustrations. It is to be understood that the details of construction and arrangement of parts may be changed without departing from the scope of the invention as set forth in the accompanying claims, since, unless otherwise noted, the preferred forms have been given by way of illustration only.

Referring to the drawings.

Figure 1:
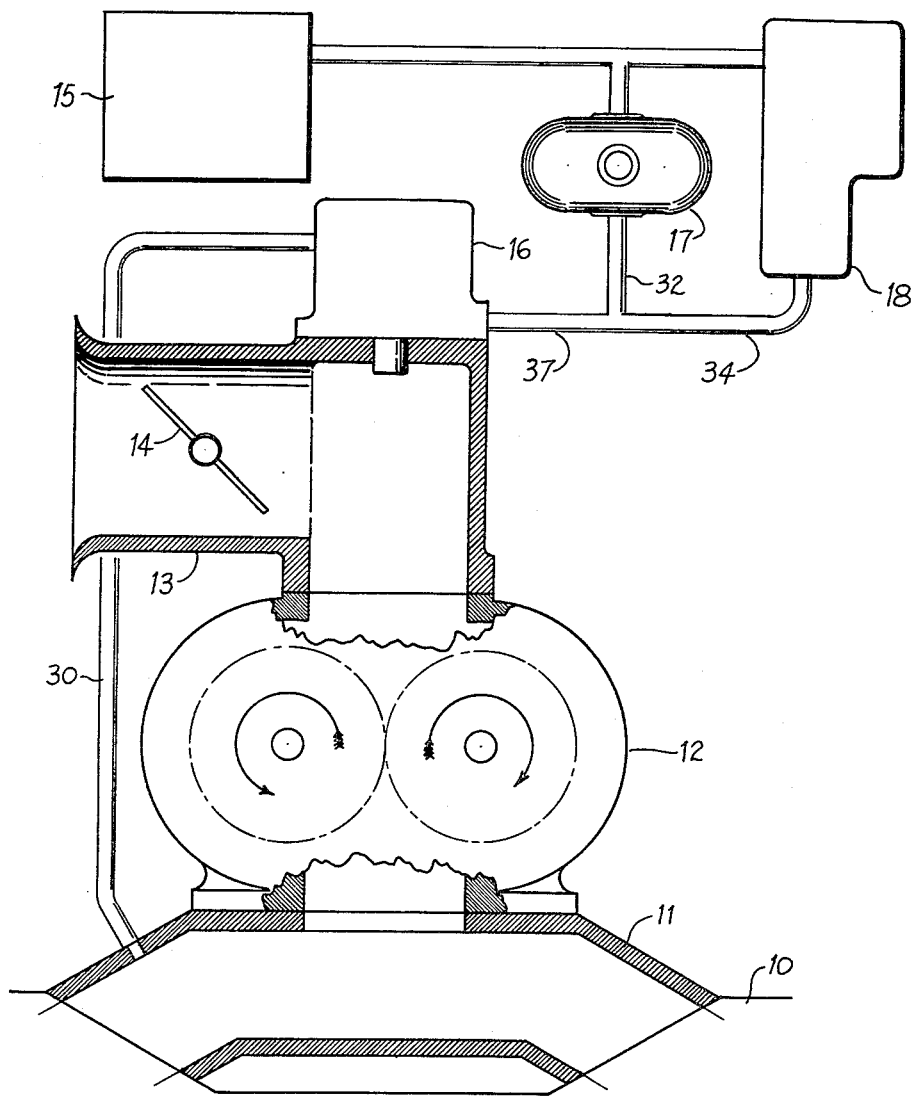
FIGURE 1 is a layout of the application of the invention to a supercharged V-type automotive engine.
Figure 3:
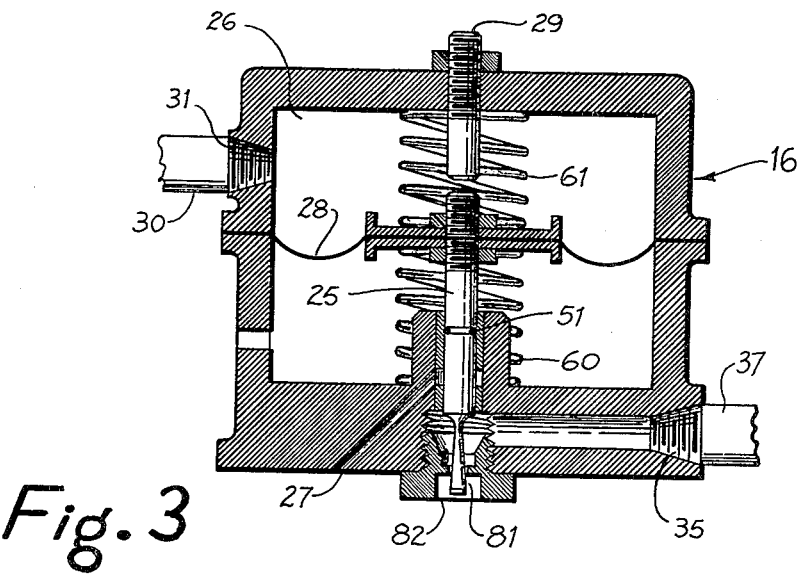
FIGURE 3 is a sectional view of the manifold pressure operated fuel regulating valve.

Referring to FIGURE 1, the present invention is shown attached to a supercharger 12 which is mounted on an internal combustion engine 10 by means of a manifold 11. The air flow is controlled by a butterfly valve 14 in the injector inlet housing 13. The engine inlet manifold pressure is conveyed by line 30 to port 31 in a fuel regulating valve 16 (FIGURE 3).

The fuel is delivered by an engine-driven positive displacement pump 17 from a vented tank 15 through conduit 32 to bypass assembly 18 by way of conduit 34 and valve 16 by way of conduit 37 and port 35. The bypass 18 (FIGURE 5) serves to regulate the pump discharge pressure in a predetermined functional relationship to the engine speed, while the valve 16 meters the fuel to the engine.

Figure 5:
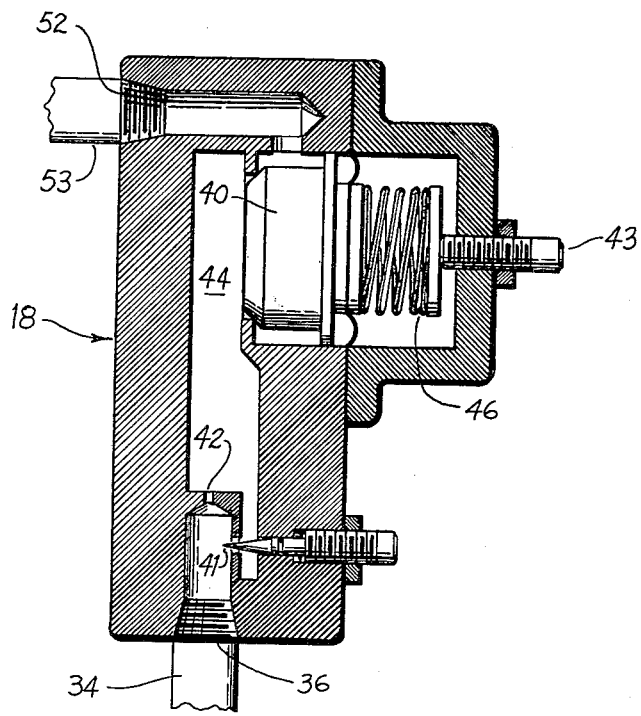
FIGURE 5 is a sectional view of a pump bypass assembly.

The operation of the bypass is readily understood by referring to FIGURE 5. The pump discharge flows through line 34 into port 36, through needle valve 41, and into chamber 44. The opening 42 is merely to assure that if the valve 41 is completely closed that restricted flow will still be permitted and the pump 17 will not be damaged. The light spring 46 is utilized for priming and engine starting and normally urges the poppet type valve 40 to a closed position. A threaded member 43 is provided whereby the spring pressure can be varied within limits. Fuel exits the bypass valve through a port 52 and returns to the inlet side of the pump by way of conduit 53. It is seen that the pressure drop across the valve 16 is approximately equal to that across the valve 41, which will be proportional to the square of the engine speed.

Figure 6:
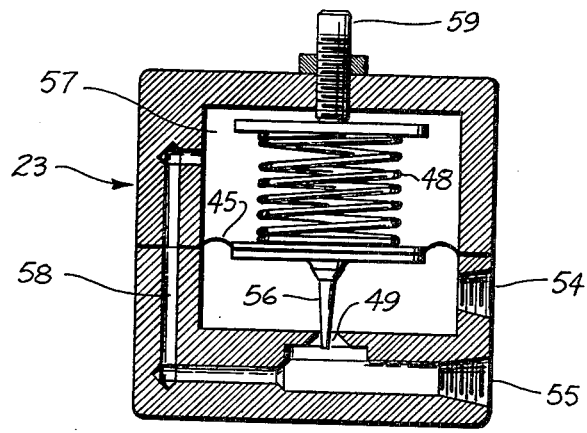
FIGURE 6 is a sectional view of the automatically variable metering restriction which is used to obtain a pressure drop proportional to an arbitrary function of flow.

If the valve 41 is replaced by, or put in parallel with the valve or automatically variable restriction 23 as depicted in FIGURE 6, the pressure drop across valve 16 can be made equal to an arbitrary function of the engine speed. The automatically variable restriction 23 includes an inlet port 54 and an outlet port 55. An orifice 49 provides communication between the inlet and outlet ports and a restriction stem 56 is movable into and out of the restriction 49 depending upon the pressure metered into a control chamber 57 from the outlet 55 by way of a conduit 58 and also depending upon the pressure of a spring member 48. This chamber is formed in part by means of a diaphragm 45 preferably made of rubber or a similar type material. The pressure of the spring 48 may be varied by means of the threaded adjustment member 59. The diaphragm 45 and spring 48 combine to yield a linear motion of the shaped needle proportional to the pressure drop across orifice 49. Thus, the pressure drop versus flow characteristic of the valve 23 will depend on the shape of the needle and the tension of the spring 48. This allows the introduction of corrections for speed-dependent volumetric efficiency variations, etc. In order to place the variable restriction 23 in parallel with the needle valve 41 in FIGURE 5, it is necessary that the inlet port 54 be connected by suitable piping to the inlet port 36 or in other words made common therewith and the outlet port 55 would be piped to communicate directly with the chamber 44. In this construction the opening 42 may be dispensed with. In replacing the needle type valve 41 with the variable restriction 23, all that need be done is connect the inlet port 54 to the conduit 34 and then suitably connect the outlet port 55 so that it communicates directly with the chamber 44.

The fuel regulating valve 16 includes an inlet port 35 and a valve or needle member 81. This valve or needle member is connected to a stem 25 which in turn is connected to a diaphragm 28. The diaphragm 28 serves to form what may be referred to as a control chamber 26. Springs 60 and 61 serve to constantly urge the valve to a central or neutral position and a stop screw member 29 regulates the upward movement of the stem 25. The communication of manifold pressure to port 31 of valve 16 produces a linear motion of the needle 81, and, depending on the needle contour, will regulate the fuel entering port 35 accordingly. The diaphragm 28 (preferably of rubber) is of the "flip-flop" type, having deep convolutions, whereby a rather large deflection can be sustained without producing membrane stresses. One such unit is that produced by the Bellofram Corporation, Burlington, Massachusetts. The springs are used end to end to give response to both manifold vacuum and boost pressures in the supercharged engine. The unsupercharged throttle valve also uses two springs in the same manner, to eliminate any need for bottoming the needle at either the full on or full off position.

The passage 27 is a vent whereby any leakage past the needle is directed into the injector inlet housing 13. This simple and inexpensive vent and O-ring 51 combination has worked quite effectively and with a minimum of friction. The stop screw 29 is used for the idle mixture adjustment, and it can be seen that the use of the two springs 60 and 61 as indicated will allow quite an accurate setting.

The design of the needle and jet assembly 81 and 82, as depicted in FIGURE 3, is critical for proper system performance. The contour of the needle 81 may be varied to produce several effects regarding mixture response with speed and manifold pressure. Two of the possible effects are shown in FIGURES 7a and 7b.

Figure 7:
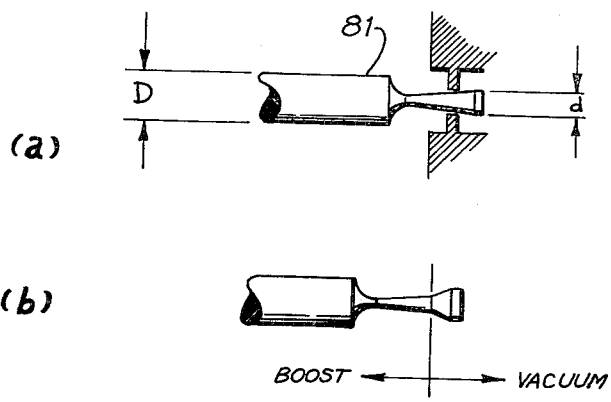
FIGURES 7a and 7b are details of the metering needles used in the fuel regulating valve.

Referring to FIGURE 7a, if the pintle and jet diameter "$d$" is made relatively small with regard to the needle shank diameter "$D$," the net pressure force on the needle will tend to close it. This will produce a slight decrease in the expected rise of fuel flow with engine speed, since the valve supply pressure increases approximately as the square of the speed. This may be utilized in the normally aspirated engine to compensate for volumetric efficiency changes.

FIGURE 7b shows a particular design for the supercharged injector. The needle has two tapers, one for the range of manifold pressures above atmospheric (boost), and the other for vacuum operation. In this manner, the fuel flow can be made to approximate the nearly adiabatic compression characteristics of the supercharger.

The discharge from throttle valve 16 is allowed to spray directly into the supercharger inlet housing 13. This injection of a divergent annular jet of fuel normal to the air flow entering the plenum chamber 13 gives excellent distribution and homogeneity of the mixture in the manifold 11. FIGURE 1 depicts a vertical mounting of the valve 16, but it has been found that a horizontal mounting (parallel to the axis of the blower 12 as shown) has advantages in some cases.

Figure 2:
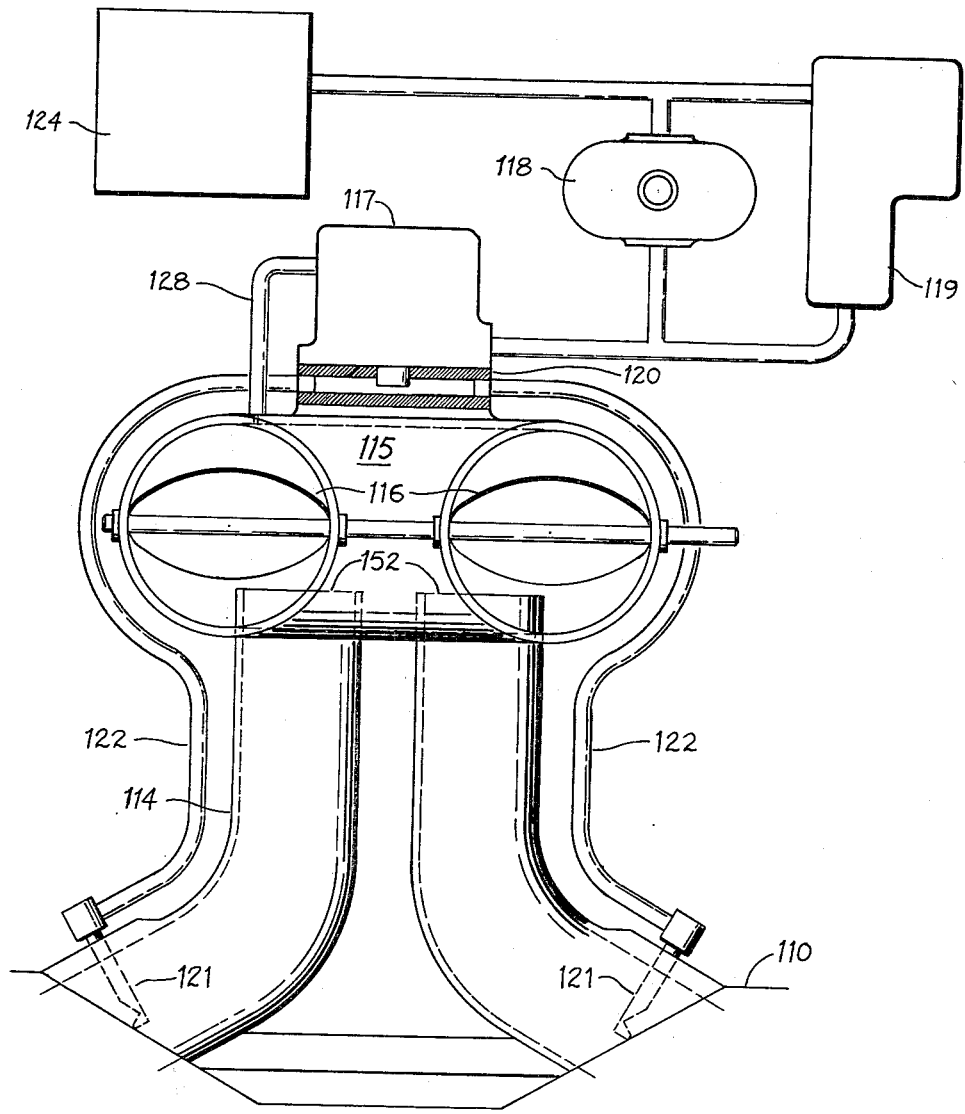
FIGURE 2 is a layout of the application of the invention to a normally aspirated V-type automotive engine with a resonant tuned intake manifold.

Referring to FIGURE 2, the present invention is shown attached to a plenum chamber 115 and tuned inlet manifold 114 on a normally aspirated V-type engine 110. The air flow is regulated by the butterflies 116 in the front of the chamber 115, passing through the ram tubes 152 before entering the engine inlet ports.

The metering scheme is essentially that of FIGURE 1, except that the fuel flow from valve 117 is directed to a distribution block 120 from whence it is injected through nozzles 121 from lines 122 into the engine inlet ports. The valve 117 is identical to valve 16, the pump 118 is identical to pump 17, and the bypass 119 is identical to the bypass 18 of FIGURE 1. This is also true of the fuel source 124. The plenum chamber pressure is transmitted to the control chamber of the valve 117 by means of a conduit 128.

Figure 4:
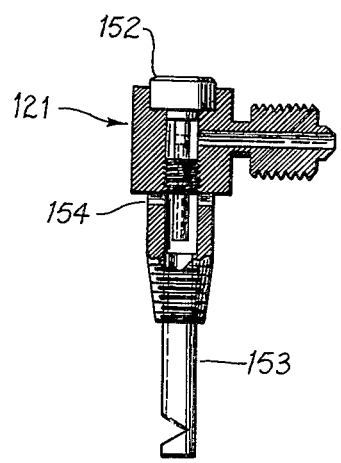
FIGURE 4 is a sectional view of an aerated injector nozzle.

A typical nozzle 121 is shown in FIGURE 4. This unit is aerated, wherein atmospheric air is admitted through ports 154 and allowed to mix with the fuel flowing from the removable jet 152. The aerated fuel is atomized by the spray deflector 153, which is oriented to direct the flow to the engine inlet port.

It will also be understood that with the construction illustrated in FIGURE 2, the automatically variable restriction 23 can be used to replace the needle valve 41 or can be used in parallel with it as described in conjunction with the structure of FIGURE 1. It will also be understood by those skilled in the art that in claiming the invention, the use of the term manifold chamber means may include any or all of the chamber or conduit means from the valves which regulate the air input and also the outlet side of the valves 16 and 117 up to the point of entrance of the fuel-air mixture into the engine cylinders.

It will be understood by those skilled in the art that the objects of my invention may be attained by the interchange of parts and construction between the systems described herein without departing from the underlying principles of the invention.

What is claimed is:

1. A fuel metering apparatus for a supercharged internal combustion engine which has an inlet manifold and a supercharger connected thereto including in combination an inlet housing in communication with said supercharger, wall means defining an air inlet passage into said inlet housing, a butterfly valve in said air inlet passage for regulating the flow of air thereinto, a fuel metering valve mounted on said inlet housing with the discharge end thereof communicating with the inlet housing to introduce fuel directly thereinto in a direction normal to the introduction of air, said fuel metering valve having a control chamber, conduit means leading from the inlet manifold to said control chamber whereby the opening of said fuel metering valve is depending on the pressure in the inlet manifold, a source of fuel, a positive displacement pump driven by the engine, conduit means connecting said source of fuel to said pump and said pump to the inlet end of said fuel metering valve, a variable pressure bypass valve, and conduit means connecting said bypass valve in parallel with said pump whereby the pressure drop across the inlet to the outlet of said fuel metering valve will be a function of the engine speed.

2. A fuel metering apparatus for a supercharged internal combustion engine which has an inlet manifold and a supercharger connected thereto including in combination an inlet housing in communication with said supercharger, wall means defining an air inlet passage into said inlet housing, a butterfly valve in said air inlet passage for regulating the flow of air thereinto, a fuel metering valve mounted on said inlet housing with the discharge end thereof communicating with the inlet housing to introduce fuel directly thereinto in a direction normal to the introduction of air, said fuel metering valve having a valve member, a diaphragm connected to said valve member for moving the same, said diaphragm forming a control chamber, conduit means leading from the inlet manifold to said control chamber whereby the opening of said fuel metering valve is dependent on the pressure in the inlet manifold, a source of fuel, a positive displacement pump driven by the engine, conduit means connecting said source of fuel, to said pump and said pump to the inlet end of said fuel metering valve, a variable pressure bypass valve, said bypass valve comprising a bypass chamber, an exteriorly adjustable needle valve on the inlet side of said bypass chamber, a poppet valve on the outlet side of said bypass chamber, spring means normally biasing said poppet valve to closed position, and conduit means connecting said bypass valve in parallel with said pump whereby said variable pressure bypass valve gives a pressure buildup which is a function of engine speed.

3. A fuel metering apparatus for an internal combustion engine which has manifold chamber means including in combination, wall means defining an air inlet passage into the manifold chamber means, a valve in said air inlet passage for regulating the flow of air thereinto, a fuel metering valve having a discharge end communicating with the manifold chamber means to introduce fuel directly thereinto, said fuel metering valve having a valve member, a diaphragm connected to said valve member for moving the same, said diaphragm forming a control chamber, conduit means leading from the manifold chamber means to said control chamber whereby the opening of said fuel metering valve is dependent on the pressure in the manifold chamber means, a source of fuel, a positive displacement pump driven by the engine, conduit means connecting said source of fuel to said pump and said pump to the inlet end of said fuel metering valve, a variable pressure bypass valve, said bypass valve comprising a bypass chamber an externally adjustable needle valve on the inlet side of said bypass chamber, a poppet valve on the outlet side of said bypass chamber, spring means normally biasing said poppet valve to closed position, an automatically variable restriction in parallel with said needle valve and comprising an inlet common with the inlet to said needle valve, an outlet connected to said bypass chamber, wall means defining a restriction opening between said inlet and outlet of said automatically variable restriction, a restriction stem movable in said opening, a diaphragm defining a second control chamber and connected to said restriction stem for moving the same, conduit means connecting said automatically variable restriction outlet to said second control chamber and conduit means connecting said bypass valve in parallel with said pump.

4. A fuel metering apparatus for an internal combustion engine which has manifold chamber means including in combination, wall means defining an air inlet passage into the manifold chamber means, a valve in said air inlet passage for regulating the flow of air thereinto, a fuel metering valve having a discharge end communicating with the manifold chamber means to introduce fuel directly thereinto, said fuel metering valve having a valve member, a diaphragm connected to said valve member for moving the same, said diaphragm forming a control chamber, conduit means leading from the manifold chamber means to said control chamber whereby the opening of said fuel metering valve is dependent on the pressure in the manifold chamber means, a source of fuel, a positive displacement pump driven by the engine, conduit means connecting said source of fuel to said pump and said pump to the inlet end of said fuel metering valve, a variable pressure bypass valve, said bypass valve comprising a bypass chamber, an automatically variable restriction on the inlet side of said bypass chamber, and comprising an inlet, an outlet connected to said bypass chamber, wall means defining an opening between said inlet and outlet of said automatically variable restriction, a restriction stem movable in said opening, a diaphragm defining a second control chamber and connected to said restriction stem for moving the same, conduit means connecting said automatically variable restriction outlet to said second control chamber, a poppet valve on the outlet side of said bypass chamber, spring means normally biasing said poppet valve to closed position, and conduit means connecting said bypass valve in parallel with said pump whereby said variable pressure bypass valve gives a pressure buildup which is a function of engine speed.

5. A fuel metering apparatus for an internal combustion engine which has manifold chamber means including in combination, wall means defining an air inlet passage into the manifold chamber means, a valve in said air inlet passage for regulating the flow of air thereinto, a fuel metering valve having a discharge end communicating with the manifold chamber means to introduce fuel directly thereinto, said fuel metering valve having a control chamber and having a discharge side directly in communication with the manifold chamber means, conduit means leading from the manifold chamber means to said control chamber whereby the opening of said fuel metering valve is dependent on the pressure in the manifold chamber means, a source of fuel, a pump driven by the engine, conduit means connecting said source of fuel to said pump and said pump to the inlet end of said fuel metering valve, a variable pressure bypass valve, and conduit means connecting said bypass valve in parallel with said pump whereby said variable pressure bypass valve gives a pressure buildup which is a function of engine speed.

6. A fuel metering apparatus for a normally aspirated internal combustion engine which has a plenum chamber and tuned inlet manifold from which extend ram tubes to the engine inlet ports with valve means controlling air flow into the plenum chamber, including in combination, a fuel metering valve having a discharge end communicating with the engine inlet ports to introduce fuel thereinto, said fuel metering valve having a valve member, diaphragm connected to said valve member for moving the same, said diaphragm forming a control chamber, conduit means leading from the plenum chamber to said control chamber whereby the opening of said fuel metering valve is dependent on the pressure in the plenum chamber, a source of fuel, a positive displacement pump driven by the engine, conduit means connecting said source of fuel to said pump and said pump to the inlet end of said fuel metering valve, a bypass valve, said bypass valve comprising a bypass chamber, restriction means on the inlet side of said bypass chamber, a valve on the outlet side of said bypass chamber, means normally biasing said valve on the outlet side of said bypass chamber to closed position, and conduit means connecting said bypass valve in parallel with said pump.

References Cited by the Examiner
UNITED STATES PATENTS

| | | |
|---|---|---|
| 2,426,153 | 8/47 | Mock. |
| 2,673,556 | 3/54 | Reggio. |
| 2,835,235 | 5/58 | Gassmann _____ 123—52 |
| 2,894,497 | 7/59 | Bolles _____ 123—52 |
| 2,918,914 | 12/59 | Ball. |

KARL J. ALBRECHT, *Primary Examiner.*
RICHARD B. WILKINSON, *Examiner.*